Dec. 12, 1950 L. H. SCHMOHL ET AL 2,533,965
FLUID PUMP
Filed Dec. 24, 1946
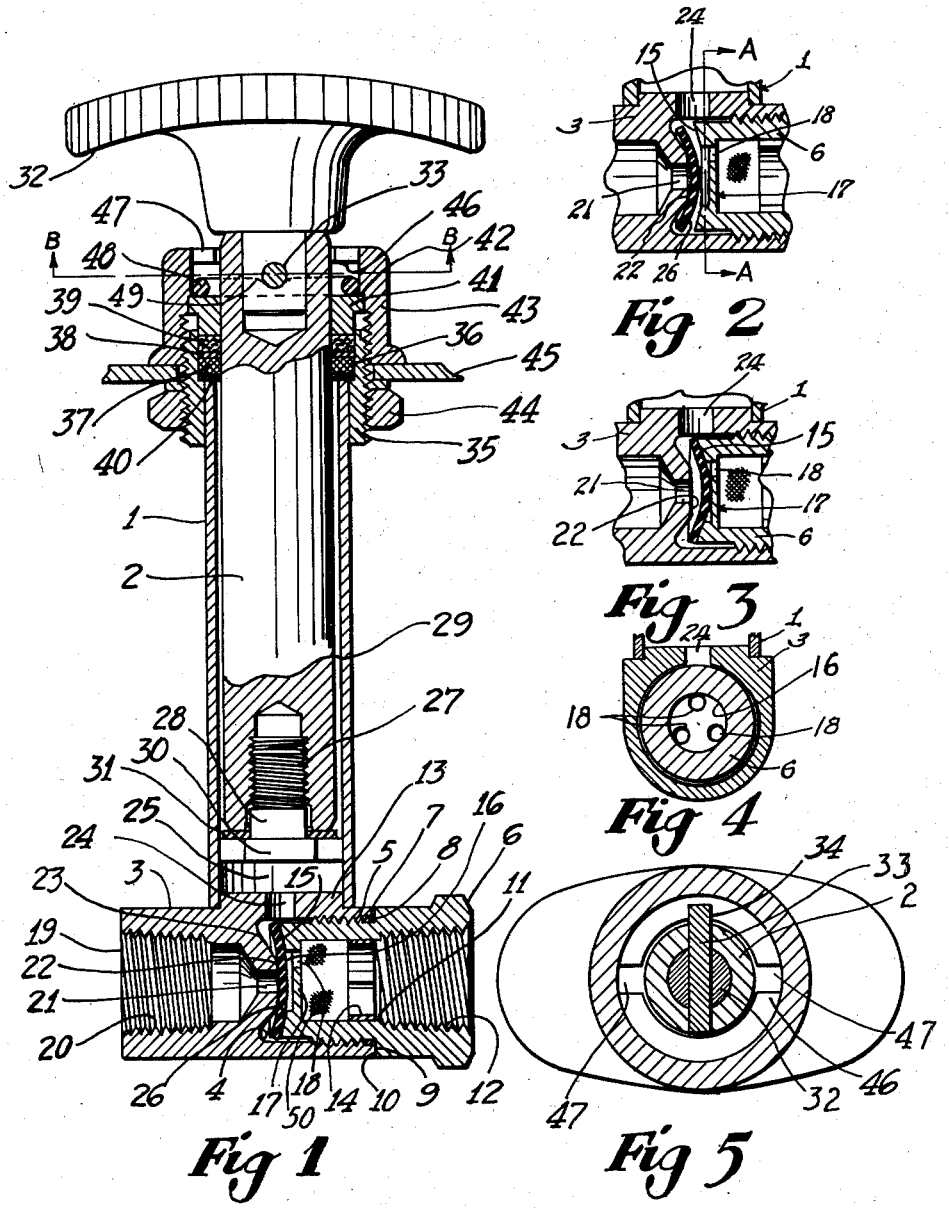
INVENTORS.
Leland H. Schmohl
John L. Habe
BY Mason, Porter, Diller
and Stewart
Attorneys.

Patented Dec. 12, 1950

2,533,965

UNITED STATES PATENT OFFICE 2,533,965

FLUID PUMP

Leland H. Schmohl, Cleveland Heights, and John L. Habe, Cleveland, Ohio, assignors to The Parker Appliance Company, Cleveland, Ohio, a corporation of Ohio Application December 24, 1946, Serial No. 718,146

1 Claim. (Cl. 103—228)

This invention relates to new and useful improvements in fluid pumps and is more particularly directed to piston pumps of the types used in aircraft for priming the engines with explosive fluid and for pumping deicing fluid to windshields.

In piston type pumps it is customary to provide two valves for controlling the passage of the fluid through the pump. One valve is associated with the inlet to the pump chamber and the other valve is associated with the discharge line therefrom. Both valves are usually spring seated and are normally closed while the pump is not in operation. During the suction stroke of the piston the inlet check valve opens to allow fluid to be drawn into the pump chamber. During the discharge stroke the inlet check valve closes and the outlet check valve opens to allow the fluid to be expelled through the outlet port.

In the present invention it is an object to provide a piston type pump in which a single valve element is associated with both the inlet and outlet ports for controlling the passage of fluid to and from the pump.

Another object of the invention is to provide a pump of the type described in which a single flexible valve element serves to normally close both the inlet and outlet passages and which may be flexed by pressure differentials on the opposite sides thereof in a manner for opening the inlet and outlet ports alternately.

Another object of the invention is to provide a piston type pump with a single flexible valve element for controlling the inlet and outlet passages in which means is provided for preventing the valve element from being jammed into the inlet passage by pressure of the discharging fluid.

Other objects and advantageous features will become apparent from the following detailed description of a preferred embodiment of the invention and with reference to the accompanying drawings, in which:

Fig. 1 is a vertical sectional view showing the pump in the normal non-operating position with the valve disk closing both the inlet and outlet ports.

Fig. 2 is a fragmentary section showing the position of the valve disk during the intake or suction stroke of the pump piston.

Fig. 3 is a fragmentary section showing the position of the valve disk during the discharge stroke of the pump piston.

Fig. 4 is a section view taken along line A—A of Fig. 2 illustrating the porting adjacent the inlet valve seat.

Fig. 5 is a section view taken along line B—B of Fig. 1 showing the arrangement for locking the piston against withdrawal when the pump is not in use.

The priming pump embodying the present invention includes a pump cylinder 1 in which a piston 2 is mounted for reciprocation. A valve housing 3 has a circular extension 13 fitting within and brazed to the lower end of the cylinder. Obviously the valve housing may be attached to the pump cylinder by screw threads or other suitable means, or it may be formed integrally therewith.

The valve housing 3 has a bore 4 which serves as a valve chamber and which is threaded toward its outer end as at 5 for receiving a threaded inlet adapter 6. A short counterbore 7 is adapted to receive a sealing gasket 8 and a transverse shoulder 9 on the inlet adapter 6 abuts the outer face 10 of the valve housing for limiting the amount the adapter may enter the housing.

The inlet adapter 6 has a bore 11 and a threaded means 12 for attachment to a source of fluid supply. A suitable strainer screen 59 is press fitted within the bore 11 and further held in place by the split ring 14. At its inner end the adapter has a flat, annular inlet valve seat 15 surrounding a shallow, circular recess 16 which terminates in a transverse wall portion 17. The inlet valve seat 15 is slightly concave, sloping toward the recess 16. Several flow passages 18, spaced radially from the center of the recess 16, connect the latter with the bore 11.

The valve housing 3 has a discharge port 19 with a threaded means 20 for attachment to a receiver of the discharged fluid. A central passage 21 connects the discharge port with the valve chamber 4. An annular valve seat 22 surrounds the passage 21 and a frusto-conical face 23 leads to the peripheral wall of valve chamber 4. A passage 24 connects the valve chamber 4 to a pump chamber 25 within the cylinder.

A circular valve disk 26 is interposed between the inlet and outlet valve seats 15 and 22. The valve disk is formed of rubber or other suitable rubber-like material that is flexible and preferably flat when unrestrained. The two valve seats are so dimensioned and spaced with respect to each other and to the valve disk that normally the latter will be slightly deformed from its unrestrained shape and make sealing contact with both valve seats. Thus, as illustrated in Figure 1, the inlet valve seat 15 causes the valve disk to bend a slight amount over the outlet valve seat 22, thus insuring initial sealing contact with both valve seats when the pump is not in operation and also when the fluid pressure within the pump is the same as in the inlet port, as hereinafter more fully explained.

It will be noted that the inlet valve seat 15 is slightly concave and contacts the valve disk only along the marginal portion thereof. The outlet valve seat 22 is cut back as at 23 so that it will contact only the central portion of the valve disk along a circle of less diameter than the smallest circle of contact between the inlet valve seat and the valve disk. When the fluid pressure is the same in both the valve chamber and the inlet port, the valve disk is in pressure balance and will assume the position of Fig. 1, closing off both inlet and outlet ports. When the fluid pressure within the pump is lower than the fluid pressure within the inlet port, the central portion of the valve disk will be seated tightly against the outlet valve seat and the marginal portion will be flexed away from the inlet seat and allow the fluid to enter the pump. See Fig. 2. When the fluid pressure within the pump is greater than that within the inlet port, the central portion of the valve disk is flexed toward the inlet seat and away from the outlet valve seat 22, as shown in Fig. 3, thus allowing the fluid to pass from the pump.

The piston 2 has at its inner end a threaded bore 27 for receiving a guide plug 28. The piston has sufficient clearance 29 to insure that it will remain out of contact with the bore of the cylinder 1. The guide plug 28 has a head thereon which engages the inner surface of the pump cylinder and guides the piston. Said plug is made of a material having suitable bearing qualities with respect to the material for the cylinder 1 and is a close sliding fit therein. The head is cut away at 30 to allow free passage of fluid from the clearance 29 to the pump chamber 25 below the plug. This prevents the trapping of fluid within clearance 29 which would otherwise interfere with the free withdrawal of the piston. A conventional lock washer 31 prevents accidental loosening of the plug.

The piston is fitted with a handle 32 attached thereto by a pin 33 which extends radially beyond the piston as at 34. An exteriorly threaded sleeve 35 is attached to the cylinder 1 by brazing or other suitable means, and has a counterbore 36 for receiving suitable packing rings 37, 38 and 39. A retaining washer 40 prevents extrusion of the packings into the clearance 29 and also serves as a stop engageable by the guide plug 28 for preventing the complete withdrawal of the piston. A packing gland 41 is engaged by the clamping shoulder 42 of the internally threaded packing cap 43 for adjusting the compression on the packing when the packing cap is threaded onto the sleeve 35. A locknut 44 is threadably mounted on the sleeve 35 for clamping the priming pump to a suitable mounting bracket 45.

The packing cap 43 has a transverse wall portion 46 spaced from the clamping shoulder 42 and is slotted as at 47. The piston assembly may be rotated with respect to the cap 43 and when the pin extension 34 is aligned with one of the slots 47 the piston may be withdrawn for reciprocation.

A ring 48 of rubber or rubber-like material is interposed between the packing gland 41 and the transverse wall 46. The longitudinal distance between the wall 46 and the packing gland is somewhat less than the sum of the cross sectional diameters of the rubber-like ring 48 and the pin 33. When the pin extension 34 is entered through a slot 47 it will strike the rubber-like ring and the latter must be depressed slightly as at 49 before the pin extension will clear the slot. When the slot has been cleared, the piston may be rotated so that the pin extension will be out of register therewith and thus prevent withdrawal of the piston. The rubber-like ring 48 remains depressed as at 49 to yieldingly press the pin extension against the wall 46 and thus provide a frictional lock to prevent accidental rotation and withdrawal of the piston.

To operate the priming pump, the handle is rotated until the pin extension 34 is in register with a slot 47 and the piston is then withdrawn. At the beginning of the piston stroke, the fluid pressures within the valve chamber 4 and the inlet port are substantially equal and the valve disk normally closes both the inlet and outlet ports as shown in Fig. 1. As the piston is withdrawn, a suction is created within the pump which reduces the pressure of the fluid within the valve chamber 4 below that of the fluid within the inlet port. The resulting pressure differential created on the opposite sides of the valve disk causes it to flex away from the inlet valve seat as shown in Fig. 2, allowing fluid to be drawn into the pump. At the end of the outward stroke the pressures within the valve chamber and inlet ports are momentarily equalized and the valve disk resumes its normal position for closing off both inlet and outlet ports. On the return stroke of the piston a pressure is created upon the fluid within the valve chamber 4 which is higher than that in the inlet port, causing the marginal portion of the valve disk to seat more tightly against the inlet valve face and forcing the central portion to flex away from the outlet valve seat 22 as shown in Fig. 3, and allowing the fluid to be discharged from the pump chamber to the outlet port 21.

During the discharge stroke, the perforated transverse wall 17 serves as a stop to prevent pressure of the discharging fluid from forcing or jamming the valve disk into the inlet passage. Upon completion of the discharge stroke the pressure within the valve chamber and inlet ports are again equalized and the valve disk returns to its normal position as shown in Fig. 1, to complete a pumping cycle.

From the above description it is apparent that a priming pump has been provided which is simple in operation and construction and which has but one valve element for controlling both the intake and discharge ports. The valve disk is flexible and is responsive to differentials of pressure for opening and closing the intake and discharge ports. When the pressure within the valve chamber is substantially the same as in the intake and discharge ports, the valve disk assumes a position for closing both ports. When the pressure within the valve chamber becomes lower than that in the intake port, the resulting pressure differential causes the disk to flex into a position for opening the inlet. When the pressure within the valve chamber becomes greater than that in the intake port, the valve disk flexes so as to open the discharge port. Means is further provided for preventing the valve disk from blowing through or becoming jammed in the intake port.

Although but one embodiment of the invention has been shown and described, it is obvious that many changes may be made in the detail construction without departing from the spirit of the invention as defined in the following claim.

We claim:

In a fluid dispensing device, a pump cylinder, a piston mounted for reciprocation in said pump cylinder, a fluid chamber in said pump cylinder, a valve casing connected to said pump cylinder and having a port leading from said fluid chamber in the pump cylinder to a fluid chamber in said valve casing, said valve casing having an outlet port, a valve seat surrounding said port, an adapter threaded into said valve casing, said adapter having an annular valve seat on the inner end thereof, and a transverse wall portion and inlet ports therein disposed radially inwardly of the annular valve seat, a single flexible valve element of substantially uniform thickness disposed between the valve seat surrounding the outlet port and the annular valve seat on the adapter and means for limiting the extent to which the adapter may be threaded into the valve casing whereby the valve seat on the casing and the valve seat on the adapter initially contact with the flexible valve element and flex the same, said valve casing having a recess opposed to the annular valve seat on the adapter whereby said valve element may be flexed away from the valve seat on the adapter to a limited extent to permit fluid to be drawn into the fluid chamber of the pump and said adapter having a recess in the end thereof directly opposed to the valve seat on the valve casing into which the central portion of the valve element may be flexed to a limited extent to permit the ejection of the fluid from the fluid chamber of a valve casing through said outlet port.

LELAND H. SCHMOHL.
JOHN L. HABE.

REFERENCES CITED

The following references are of record in the file of this patent:

UNITED STATES PATENTS

| Number    | Name   | Date          |
|-----------|--------|---------------|
| 947,536   | Wenkel | Jan. 25, 1910 |
| 1,506,012 | Lewis  | Aug. 26, 1924 |
| 1,633,772 | Clapp  | June 28, 1927 |
| 2,179,354 | Scott  | Nov. 7, 1939  |